(12) United States Patent
Shepherd et al.

(10) Patent No.: US 12,586,441 B2
(45) **Date of Patent: *Mar. 24, 2026**

(54) SELECTIVE REDEMPTION OF GAMING ESTABLISHMENT TICKET VOUCHERS

(71) Applicant: IGT, Las Vegas, NV (US)

(72) Inventors: Jeffery Shepherd, Reno, NV (US);
Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,399

(22) Filed: Jan. 3, 2024

(65) Prior Publication Data

US 2024/0135778 A1 Apr. 25, 2024

Related U.S. Application Data

(63) Continuation of application No. 17/684,127, filed on Mar. 1, 2022, now Pat. No. 11,900,766.

(51) Int. Cl.
| | |
|---|---|
| *G07F 17/32* | (2006.01) |
| *G06Q 30/018* | (2023.01) |
| *G06Q 50/34* | (2012.01) |

(52) U.S. Cl.
CPC ..... *G07F 17/3241* (2013.01); *G06Q 30/0185* (2013.01); *G06Q 50/34* (2013.01); *G07F 17/3244* (2013.01)

(58) Field of Classification Search
CPC ............ G07F 17/3241; G07F 17/3244; G06Q 30/0185; G06Q 50/34
See application file for complete search history.

(56) References Cited

U.S. PATENT DOCUMENTS

| | | | |
|---|---|---|---|
| 7,828,646 B2 | 11/2010 | Franks | |
| 7,976,382 B2 | 7/2011 | Benbrahim | |
| 7,979,509 B1 * | 7/2011 | Malmskog .......... | H04L 67/2885 |
| | | | 709/219 |
| 8,023,715 B2 | 9/2011 | Jones et al. | |
| 8,216,064 B1 | 7/2012 | Muskin | |
| 8,382,583 B2 | 2/2013 | Zinder et al. | |
| 8,407,141 B2 | 3/2013 | Mullen et al. | |
| 8,556,707 B2 | 10/2013 | Beer et al. | |
| 8,595,137 B2 | 11/2013 | Sears et al. | |
| 8,958,534 B2 | 2/2015 | Bodman | |
| 9,148,569 B2 | 9/2015 | Resende et al. | |
| 9,153,095 B2 | 10/2015 | Adiraju et al. | |
| 9,530,277 B2 | 12/2016 | Nelson et al. | |
| 9,552,573 B2 | 1/2017 | Kulpati et al. | |
| 9,672,686 B2 | 6/2017 | Nguyen | |
| 9,747,597 B2 | 8/2017 | Wu | |
| 9,990,801 B2 | 6/2018 | Sanford et al. | |
| 10,297,105 B2 * | 5/2019 | LeMay .............. | G07F 17/3223 |
| 10,402,815 B2 | 9/2019 | Sharma et al. | |
| 11,900,766 B2 * | 2/2024 | Shepherd ........... | G07F 17/3248 |

(Continued)

FOREIGN PATENT DOCUMENTS

WO 2014078696 A2 5/2014

*Primary Examiner* — Steve Rowland
(74) *Attorney, Agent, or Firm* — Neal, Gerber & Eisenberg LLP

(57) ABSTRACT

Systems and methods that associate zero, one or more redemption attributes with a ticket voucher, wherein the associated redemption attribute determines one or more channels by which the ticket voucher may be redeemed.

20 Claims, 3 Drawing Sheets

(56)                 References Cited

U.S. PATENT DOCUMENTS

| | | |
|---|---|---|
| 2003/0162591 A1 | 8/2003 | Nguyen et al. |
| 2003/0187798 A1 | 10/2003 | Mckinley et al. |
| 2004/0054623 A1 | 3/2004 | Collins et al. |
| 2004/0058728 A1 | 3/2004 | Fayter et al. |
| 2005/0137016 A1* | 6/2005 | Enzminger ............. G07F 17/32 |
| | | 463/42 |
| 2007/0087817 A1 | 4/2007 | Beer et al. |
| 2007/0203832 A1 | 8/2007 | Babi et al. |
| 2010/0183246 A1 | 7/2010 | King et al. |
| 2012/0078792 A1 | 3/2012 | Bacastow et al. |
| 2012/0252567 A1 | 10/2012 | Gagner et al. |
| 2013/0103582 A1 | 4/2013 | Singfield |
| 2013/0198071 A1 | 8/2013 | Jurss |
| 2013/0223721 A1 | 8/2013 | Nepomniachtchi et al. |
| 2014/0270463 A1 | 9/2014 | Narendra et al. |
| 2015/0065231 A1 | 3/2015 | Anderson et al. |
| 2015/0080113 A1 | 3/2015 | Yankton et al. |
| 2015/0248806 A1 | 9/2015 | Mueller |
| 2015/0286860 A1 | 10/2015 | Ruiz-tapiador |
| 2016/0044203 A1 | 2/2016 | Paul et al. |
| 2016/0171830 A1 | 6/2016 | Curtin et al. |
| 2016/0292963 A1* | 10/2016 | Chun ................... G07F 17/3241 |
| 2017/0092054 A1 | 3/2017 | Petersen et al. |
| 2017/0140365 A1 | 5/2017 | Hameed et al. |
| 2017/0154497 A1 | 6/2017 | Nguyen |
| 2017/0213199 A1 | 7/2017 | Schwartz |
| 2017/0262834 A1 | 9/2017 | Curtin et al. |
| 2018/0047249 A1 | 2/2018 | Nelson et al. |
| 2018/0061179 A1 | 3/2018 | Miri et al. |
| 2018/0082529 A1 | 3/2018 | Mchugh et al. |
| 2018/0211243 A1 | 7/2018 | Ekpenyong et al. |
| 2019/0043308 A1 | 2/2019 | Higgins et al. |
| 2019/0122492 A1* | 4/2019 | Nguyen ............. G07F 17/3241 |
| 2019/0156541 A1* | 5/2019 | Isgar .................... G06F 40/186 |
| 2019/0213832 A1 | 7/2019 | Tsutsui |
| 2019/0272704 A1 | 9/2019 | Lemay et al. |
| 2019/0332757 A1 | 10/2019 | Chen et al. |
| 2020/0302742 A1* | 9/2020 | Rutherford ......... G07F 17/3241 |
| 2021/0074109 A1 | 3/2021 | Depta et al. |
| 2021/0241575 A1* | 8/2021 | Shepherd ............ G07F 17/3248 |
| 2022/0036362 A1* | 2/2022 | Warren, Jr. ......... G07F 17/3241 |
| 2023/0316865 A1* | 10/2023 | Lutnick .............. G07F 17/3241 |
| | | 463/16 |

* cited by examiner

SELECTIVE REDEMPTION OF GAMING ESTABLISHMENT TICKET VOUCHERS

PRIORITY CLAIM

This application is a continuation of, claims the benefit of and priority to U.S. patent application Ser. No. 17/684,127, filed on Mar. 1, 2022, the entire contents of which is incorporated by reference herein.

BACKGROUND

In various embodiments, the systems and methods of the present disclosure associate zero, one or more redemption attributes with a ticket voucher, wherein the associated redemption attribute determines one or more channels by which the ticket voucher may be redeemed.

Gaming machines may provide players awards in primary games. Gaming machines generally require the player to place a wager to activate the primary game. The award may be based on the player obtaining a winning symbol or symbol combination and on the amount of the wager. When a player cashes out a credit balance of such gaming machines, these gaming machines may provide the player with a ticket voucher redeemable for the amount of the credit balance.

BRIEF SUMMARY

In certain embodiments, the present disclosure relates to a system including a processor, and a memory device that stores a plurality of instructions. When executed by the processor responsive to a request to issue a ticket voucher associated with an amount of funds, the instructions cause the processor to determine, based on data received from a gaming establishment device, if any activity associated with the request to issue the ticket voucher comprises a potential money laundering activity. When executed by the processor responsive to the determination being that an activity associated with the request to issue the ticket voucher comprises the potential money laundering activity and responsive to a determination to issue the ticket voucher associated with the amount of funds, the instructions cause the processor to cause the issued ticket voucher to be associated with a restricted redemption attribute.

In certain embodiments, the present disclosure relates to a system including a processor, and a memory device that stores a plurality of instructions. When executed by the processor responsive to a first request to redeem a ticket voucher in association with a first type of gaming establishment device, the instructions cause the processor to determine if the ticket voucher is associated with a restricted redemption attribute indicative of potential money laundering activity. When executed by the processor responsive to the determination being that the ticket voucher is associated with the restricted redemption attribute, the instructions cause the processor to deny the first request to redeem the ticket voucher in association with the first type of gaming establishment device.

In certain embodiments, the present disclosure relates to a method of operating a system. Responsive to a request to issue a ticket voucher associated with an amount of funds, the method includes determining, by a processor and based on data received from a gaming establishment device, if any activity associated with the request to issue the ticket voucher comprises a potential money laundering activity. Responsive to the determination being that an activity associated with the request to issue the ticket voucher comprises the potential money laundering activity and responsive to a determination to issue the ticket voucher associated with the amount of funds, the method includes causing, by the processor, the issued ticket voucher to be associated with a restricted redemption attribute.

Additional features are disclosed, and will be apparent from the following Detailed Description and the figures.

DETAILED DESCRIPTION

Figure 1:
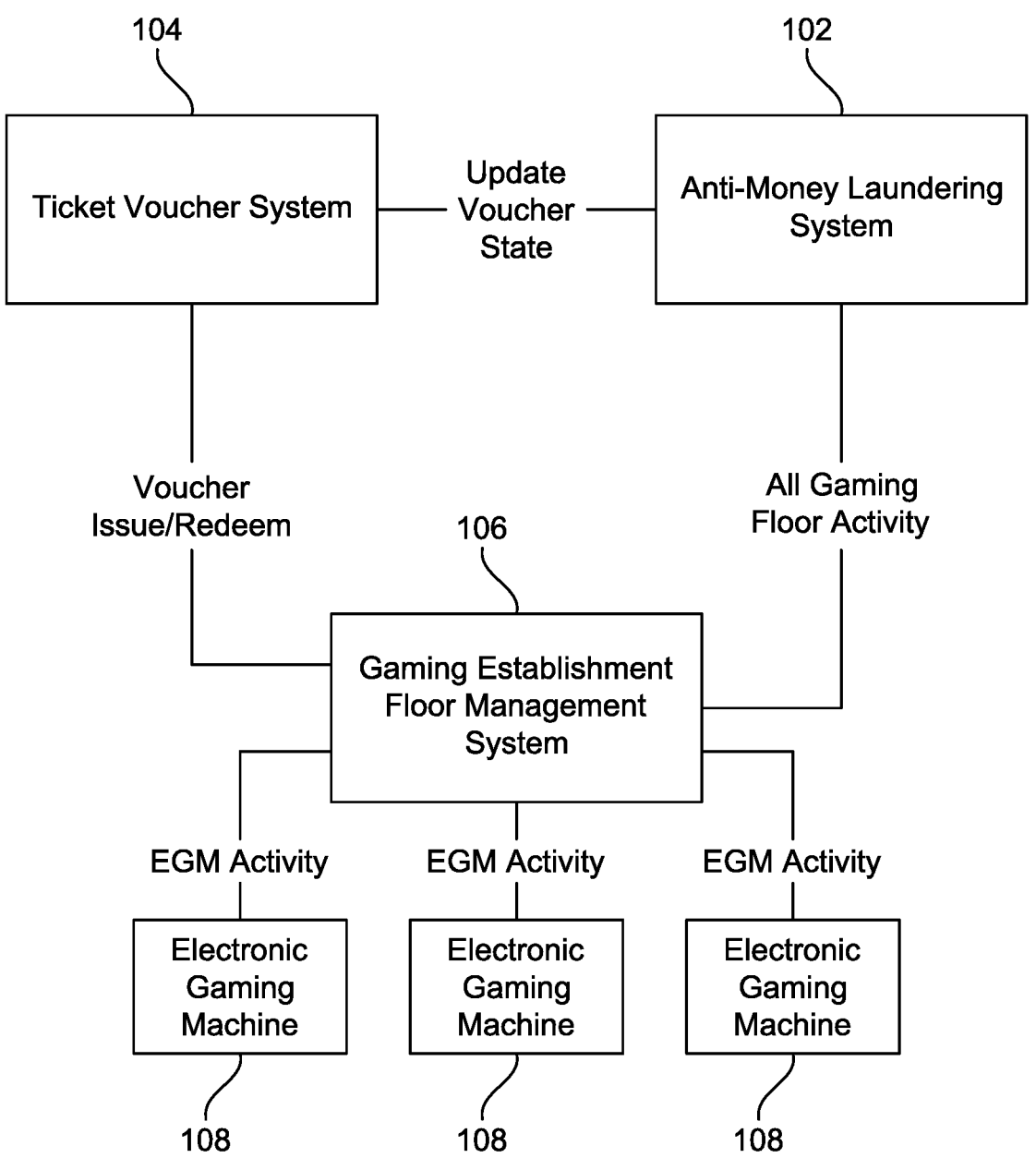
FIG. 1 is a schematic diagram of the interactions between a plurality of different components of the system of one embodiment of the present disclosure that operate to employ ticket vouchers associated with restricted redemption attributes.

In various embodiments, in association with a user procuring a ticket voucher (e.g., an anonymous bearer instrument associated with an amount of funds and redeemable for cash via a kiosk or a cashier and/or redeemable for game play on a gaming establishment device), the system assigns one or more redemption attributes to the ticket voucher. In these embodiments, different redemption attributes designate different restrictions under which the ticket voucher may be redeemed for an amount of funds associated with the ticket voucher. In such embodiments, the system determines, based on one or more tracked activities that occurred (or did not occur) in association with the procurement of the ticket voucher, whether to apply any conditions to the redemption of the ticket voucher, such as any conditions to how the ticket voucher may be redeemed. This tracking of activities coupled with the utilization of zero, one or more restricted redemption attributes enables a heightened level of scrutiny for certain ticket vouchers procured in association with certain tracked activities. For example, upon the system determining that a ticket voucher is attempted to be procured via certain activities suspected of potentially being part of a money laundering venture, the system associates a suspect attribute with the ticket voucher. In this example, such a suspect attribute associated with the ticket voucher provides that the ticket voucher may be redeemed at certain outlets, such as via a gaming establishment cashier, but not otherwise redeemed at certain other outlets, such as an automated ticket voucher redemption kiosk. As illustrated by this example, the system of the present disclosure employs different restricted redemption attributes for different ticket vouchers obtained in association with different activities to deter certain unwanted activities previously employing ticket vouchers.

Regarding these unwanted activities, one such recognized problem that gaming establishments encounter is use of a gaming establishment device, such as an electronic gaming machine ("EGM"), to launder money. One way money is laundered at a gaming establishment is by converting money into another instrument, such as a ticket voucher, then, at some later time, converting the ticket voucher to cash by redeeming the ticket voucher at a kiosk. For example, this form of money laundering includes inserting a relatively large amount of cash into an EGM to increase a credit balance of the EGM, engaging in minimal to no play of the EGM and then cashing out the amount of the credit balance of the EGM to a ticket voucher which is redeemable for the associated amount of funds. Since gaming establishments are required to report on suspected money laundering activities as well as take proactive steps to combat money laundering activities, the system of the present disclosure utilizes the generated ticket vouchers and the different avenues which the generated ticket vouchers may be redeemed to better enforce money laundering regulations and thus combat money laundering activities. Specifically, the employment of a restricted redemption attribute associated with certain ticket vouchers obtained via suspected money laundering activities and the enhanced limitations over how, or even if, such ticket vouchers may be redeemed, combat money laundering activities by driving any redemption of the ticket voucher to certain gaming establishment interfaces, such as gaming establishment personnel and/or eliminating any redemption of the ticket voucher at other gaming establishment interfaces, such as a ticket voucher redemption kiosk available to redeem ticket vouchers not obtained via any suspected money laundering activities. Accordingly, the system of the present disclosure enables a gaming establishment patron to redeem a ticket voucher while complying with various anti-money laundering regulations which require the tracking of certain financial transactions associated with a gaming establishment patron.

In certain embodiments, the present disclosure employs an anti-money laundering system that is in communication with one or more ticket voucher systems that issue and/or redeem one or more types of ticket vouchers in association with one or more types of activities. Such an anti-money laundering system of these embodiments is also in communication with one or more gaming establishment floor management systems that track different activities occurring at a gaming establishment device. Such a gaming establishment device includes, but is not limited to: an EGM (e.g., a slot machine, a video poker machine, a video lottery terminal, a terminal associated with an electronic table game, a terminal associated with a live table game, a video keno machine, a video bingo machine and/or a sports betting terminal (that offers sports betting opportunities and, in certain instances, wagering games)), a kiosk, a seat-level gaming table component, a table-level gaming table component, and/or a mobile gaming table component. In these embodiments, the anti-money laundering system sits at the intersection of one or more ticket voucher systems and one or more gaming establishment floor management systems and interacts with these systems to track potential money laundering activities occurring at gaming establishment devices and associating an additional layer of anti-money laundering security with any ticket vouchers issued in connection with such potential money laundering activities. For example, a server of an anti-money laundering system is in communication with a server of a gaming establishment floor management system as well as a server of a ticket voucher system (such as a server of a cashless wagering ticket voucher system (e.g., a ticket-in/ticket-out ("TITO") system) which issues and redeems cashless wagering ticket vouchers and/or a server of a sports wagering ticket voucher system which issues and redeems sports wagering ticket vouchers), to detect zero, one or more events indicative of potential money laundering occurring at a gaming establishment device. In this example, upon the anti-money laundering system detecting any events indicative of potential money laundering occurring at a gaming establishment device, the anti-money laundering system operates with the ticket voucher system to cause any ticket voucher issued in connection with this potential money laundering activity to have relatively limited redemption avenues available.

More specifically, in various embodiments, the system of the present disclosure includes various components which operate with each other to introduce certain safeguards associated with the utilization of ticket vouchers in a gaming establishment environment. For example, as seen in FIG. 1, an anti-money laundering system 102 is in communication with a ticket voucher system 104 and also in communication with a gaming establishment floor management system 106 in communication with one or more EGMs 108 (and/or other gaming establishment devices operable to issue and redeem ticket vouchers associated with the ticket voucher system). In operation of this example, upon an occurrence of a reporting event occurring at an EGM, at a periodic interval and/or upon a request from the gaming establishment floor management system, the EGM (or a component associated with that EGM, such as a slot machine interface board in communication with a processor of that EGM) communicates data associated with zero, one or more events occurring at that EGM to the gaming establishment floor management system. In addition to the communication of activity data from the EGMs to the gaming establishment floor management system, upon an occurrence of a reporting event occurring in association with the gaming establishment floor management system, at a periodic interval and/or upon a request from the anti-money laundering system, the gaming establishment floor management system communicates part or all of the data associated with one or more events occurring at such EGMs to the anti-money laundering system. In these embodiments, the anti-money laundering system analyzes the data to determine any suspected money laundering activities occurring at that EGM. That is, the anti-money laundering system compares the activities occurring at an EGM to patterns of activities associated with money laundering ventures to determine if the activities occurring at the EGM qualify as potentially suspect activities that warrant certain controls or limitations in the redemption of any ticket vouchers issued in association with such activities at the EGM.

In one such embodiment, the anti-money laundering system analyzes data associated with bill in events at the EGM (or other gaming establishment device) to determine suspected money laundering activities. For example, since certain instances of money laundering can be detected if a gaming establishment patron inserts a relatively large quantity of bills into the EGM to build a relatively large credit balance of the EGM and the patron places a minimal amount of wagers (or no wagers at all) on the EGM before attempting to cash out the credit balance for a ticket voucher, the anti-money laundering system detects such activity as potential money laundering activities occurring at the EGM.

In another such embodiment, the anti-money laundering system additionally or alternatively analyzes data associated with metering events at the EGM (or other gaming establishment device) to determine suspected money laundering activities. For example, since certain instances of money laundering can be detected by monitoring an EGM meter (and specifically a movement of the EGM meter) from the beginning of a session to the ending of the session when an attempted cash out of a credit balance of the EGM to a ticket voucher occurs, the anti-money laundering system detects such activity as potential money laundering activities occurring at the EGM.

In certain embodiments, in addition to the anti-money laundering system monitoring for any activities that potentially warrant alerting the ticket voucher system, the system enables an amount of funds deposited in an EGM to be converted to one or more ticket vouchers (that may or may not be associated with a restricted redemption attribute). In one such embodiment, the system enables a user that has an amount of cash (or other forms of payment) to utilize an EGM to convert the cash to one or more ticket vouchers via the user first depositing the amount of cash into the EGM and then subsequently cashing out (either pre or post any gaming activity) an amount of a credit balance of the EGM in exchange for a ticket voucher. In another such embodiment, the system enables a user that has one or more printed ticket vouchers to utilize an EGM to convert the printed ticket voucher(s) to a virtual ticket voucher associated with a gaming establishment account maintained for the user. In another such embodiment, the system enables a user that has one or more printed ticket vouchers to utilize an EGM to convert the printed ticket voucher(s) to an anonymous virtual ticket voucher associated with a mobile device.

In certain embodiments, the system enables an amount of funds deposited in a kiosk to be converted to one or more ticket vouchers (that may or may not be associated with a restricted redemption attribute). In one such embodiment, the system enables a user that has an amount of cash (or other forms of payment) to utilize a kiosk to convert the cash to one or more ticket vouchers via the user depositing the amount of cash into the kiosk and then subsequently cashing out the deposited amount in exchange for a ticket voucher. In another such embodiment, the system enables a user that has one or more printed ticket vouchers to utilize a kiosk to convert the printed ticket voucher(s) to a virtual ticket voucher associated with a gaming establishment account maintained for the user. In another such embodiment, the system enables a user that has one or more printed ticket vouchers to utilize a kiosk to convert the printed ticket voucher(s) to an anonymous virtual ticket voucher associated with a mobile device.

In certain embodiments, the system enables an amount of funds associated with a gaming establishment account maintained for the user, such as a gaming establishment retail account or a cashless wagering account, to purchase a ticket voucher (that may or may not be associated with a restricted redemption attribute). In these embodiments, the system enables a user to transfer an amount of funds from a gaming establishment account maintained for the user to a ticket voucher system in exchange for a ticket voucher.

In various embodiments where funds from one or more sources are potentially used to obtain a ticket voucher (that may or may not be associated with a restricted redemption attribute), when a user attempts to obtain one or more ticket vouchers, the system determines whether to authorize the exchange of an amount of funds for a ticket voucher. If the system determines not to authorize the exchange of an amount of funds for a ticket voucher, the system communicates a denial to the user and does not cause any ticket vouchers to be issued. On the other hand, if the system determines to authorize the exchange of an amount of funds for a ticket voucher, the system: (i) retains the amount of funds (if, for example, an amount of cash is exchanged at a kiosk for a ticket voucher); (ii) updates a credit balance to reflect the exchange of an amount of funds for a ticket voucher (if, for example, a credit balance of an EGM is being cashed out in exchange for a ticket voucher); and/or (iii) updates an account to reflect the exchange of an amount of funds for a ticket voucher (if, for example, a gaming establishment account associated with the user is exchanged for a ticket voucher). It should be appreciated that since a created ticket voucher may take multiple forms, the system includes multiple ways to convey such a created ticket voucher to the user. In one embodiment wherein the created ticket voucher takes the form of a paper ticket voucher, the ticket voucher system causes a ticket voucher printer to print the created ticket voucher. In another embodiment wherein the created ticket voucher takes the form of a virtual ticket voucher, the ticket voucher system communicates data to a device associated with the user, such as a mobile device running an application associated with the ticket voucher system, to transfer the created virtual ticket voucher to the user.

In certain embodiments, in association with a ticket voucher system issuing a ticket voucher, the ticket voucher system stores a record of the ticket voucher. Such a record of the ticket voucher includes, for each ticket voucher, ticket voucher identification information including, but not limited to, one or more of: (i) a gaming establishment name; (ii) a gaming establishment address; (iii) a ticket voucher title (e.g., "cashout ticket" or "cashout voucher"); (iv) a ticket voucher validation number (e.g., an eighteen digit number or code of the issued ticket voucher printed on the ticket voucher); (v) a ticket voucher validation number bar code (i.e., a bar code that contains an encoded ticket voucher validation number; (vi) a ticket date/time (i.e., a date/time when the ticket voucher was issued); (vii) a ticket number (i.e., a sequential number printed on the ticket voucher by an EGM); (viii) an amount (i.e., an amount of the ticket voucher as a numerical value with a currency sign); (ix) an amount in words (i.e., the amount of the issued ticket voucher in words); (x) an expiration (i.e., an expiration date of the ticket voucher (if the ticket is a promotion or non-cashable ticket)); (xi) a machine identification (i.e., an asset or machine number of the device, such as an EGM or a kiosk, that printed the ticket voucher); (xii) font or formatting information associated with the ticket voucher, and/or (xiii) an image of the ticket voucher (e.g., an image of a front of the ticket voucher and/or an image of a back of the ticket voucher).

In certain embodiments, in association with (and/or subsequent to) a ticket voucher system issuing a ticket voucher, the ticket voucher system additionally interfaces with the anti-money laundering system to inquire if any activities associated with the procurement of the ticket voucher qualify as potentially suspect activities that require additional scrutiny before the ticket voucher may be redeemed. That is, for a ticket voucher issued by (or requested to be issued by) the ticket voucher system, the ticket voucher system operates with the anti-money laundering system to determine if any data indicative of a heightened redemption scrutiny needs to be associated with that ticket voucher.

If the anti-money laundering system indicates that one or more activities associated with the procurement of the ticket voucher qualify as potentially suspect activities, the ticket voucher system stores that indication in association with the data associated with the ticket voucher. That is, upon a determination that a ticket voucher may have been acquired as part of a money laundering operation, the system assigns one or more redemption attributes to the ticket voucher that designate one or more limits or controls associated with the potential redemption of that ticket voucher for an amount of funds associated with the ticket voucher. For example, in addition to storing ticket voucher identification information associated with a ticket voucher, the ticket voucher system stores zero, one or more indications that any activities associated with the procurement of the ticket voucher qualify as potentially suspect activities that require additional scrutiny before the ticket voucher may be redeemed. These indications provide certain limits or controls on the future redemption of such a ticket voucher. In different embodiments, these redemption limits or controls include, but are not limited to one or more of: if the ticket voucher may or may not be redeemed, a location such a ticket voucher may or may not be redeemed at, a type of device that may or may not redeem such a ticket voucher, a value of a ticket voucher that may be redeemed at a certain location and/or in association with a certain device, an age of a ticket voucher that may be redeemed at a certain location and/or in association with a certain device, and/or an identity of the patron attempting to redeem such a ticket voucher and whether such a patron is enabled to redeem the ticket voucher at a certain location and/or in association with a certain device.

In certain embodiments, if the ticket voucher system operating with the anti-money laundering system determines that a ticket voucher needs to be associated with a heightened redemption scrutiny, the system assigns a designated state to the ticket voucher. In these embodiments, since ticket vouchers have a set of states associated with them that control whether a ticket voucher can be redeemed (i.e., an unpaid state) or is already redeemed (i.e., a paid state), the system employs a limited redemption state (i.e., a suspect state) that dictates that the ticket voucher can be redeemed but only via certain redemption transactions. Such a limited redemption state provides that the ticket voucher is unpaid, but suspected to be part of money laundering operation and thus not redeemable via certain redemption avenues, such as via certain devices (e.g., a ticket voucher redemption kiosk and/or an EGM). Rather, a ticket voucher associated with a limited redemption state may be redeemed via certain other redemption avenues, such as a gaming establishment interface (e.g., a casino cage, where the holder of the ticket voucher must engage with gaming establishment personnel to attempt to redeem their voucher).

In certain embodiments, if the ticket voucher system operating with the anti-money laundering system determines that a ticket voucher needs to be associated with a heightened redemption scrutiny, the system additionally or alternatively assigns a designated indicator with the ticket voucher. Such a designated indicator is stored by the ticket voucher system in association with the ticket voucher and dictates that the ticket voucher can be redeemed but only via certain redemption transactions. In these embodiments, such a limited redemption indicator provides that the ticket voucher is unpaid, but suspected to be part of money laundering operation and thus not redeemable via certain redemption avenues, such as via certain devices (e.g., a ticket voucher redemption kiosk and/or an EGM). Rather, a ticket voucher assigned a limited redemption indicator may be redeemed via certain other redemption avenues, such as a gaming establishment interface (e.g., a casino cage, where the holder of the ticket voucher must engage with gaming establishment personnel to attempt to redeem their voucher).

In certain embodiments, if the ticket voucher system operating with the anti-money laundering system determines that a ticket voucher needs to be associated with a heightened redemption scrutiny, the system additionally or alternatively utilizes certain aspects of the ticket voucher identification information associated with the ticket voucher to designate that ticket voucher as having a designated status. Such a designated status is stored by the ticket voucher system in association with the ticket voucher and dictates that the ticket voucher can be redeemed but only via certain redemption transactions. For example, a ticket voucher includes an interleaved 2 of 5 barcode which encodes a multi-digit number validation identifier (i.e., the validation ID). In this example, to designate the ticket voucher as being associated with a potential money laundering operation, the system utilizes the first few digits of the validation number identifying the ticket voucher to alert the ticket voucher system of the designated status. In another example, the system adds additional information to the data presented in the barcode of certain ticket vouchers identified as being of the designated status, such as by adding additional data to the prefix and/or suffix of the unique ticket voucher validation number of the ticket voucher and/or adding one or more images, patterns, barcodes, lines, words and/or numbers (which a bill validator of a ticket handling device may utilize optical character recognition technology to identify). In these embodiments, such a limited redemption status provides that the ticket voucher is unpaid, but suspected to be part of money laundering operation and thus not redeemable via certain redemption avenues, such as via certain devices (e.g., a ticket voucher redemption kiosk and/or an EGM). Rather, a ticket voucher assigned a limited redemption indicator may be redeemed via certain other redemption avenues, such as a gaming establishment interface (e.g., a casino cage, where the holder of the ticket voucher must engage with gaming establishment personnel to attempt to redeem their voucher).

Figure 2:
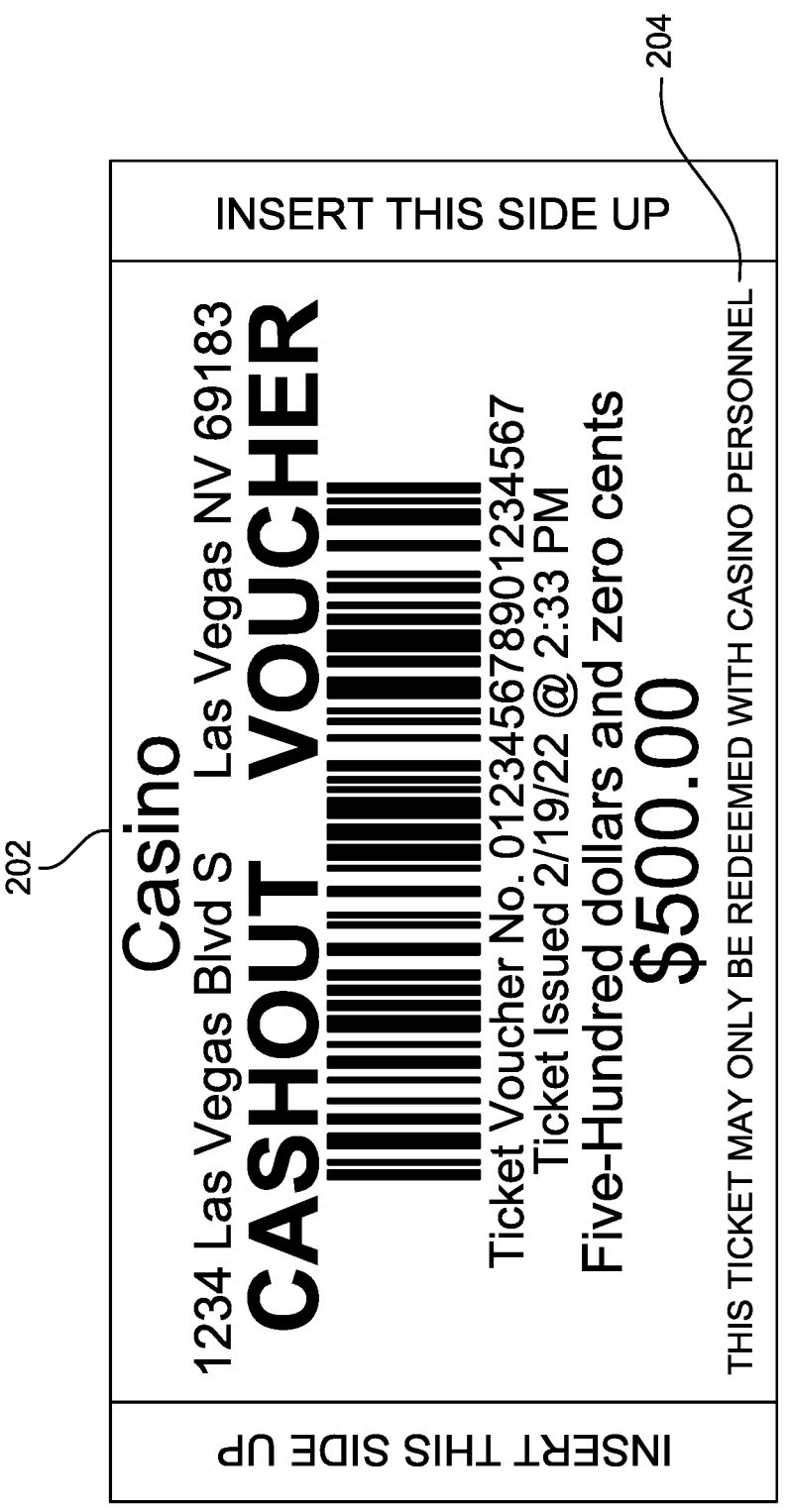
FIG. 2 is an example graphical user interface of one embodiment of the present disclosure displayed by a gaming establishment device in association with an issuance of a ticket voucher associated with a restricted redemption attribute.

In certain embodiments, if the ticket voucher system operating with the anti-money laundering system determines that a ticket voucher needs to be associated with a heightened redemption scrutiny, the system notifies the holder of the ticket voucher of such an association. In one such embodiment, the system causes a notification indicating any limitations on the redemption of the ticket voucher to appear on the ticket voucher. For example, as seen in FIG. 2, upon the system assigning a redemption limitation with a ticket voucher 202, the system causes a notification 204 to be printed on the ticket voucher that informs the holder of the ticket voucher that the ticket voucher may be redeemed by casino personnel only and not at any kiosk or EGM. In another such embodiment, the system causes a notification indicating any limitation on the redemption of the ticket voucher to be provided to the holder of the ticket voucher via the gaming establishment device that issued the ticket voucher (e.g., via a display device of a kiosk and/or an EGM), via a remote host controlled service window displayed by the gaming establishment device that issued the ticket voucher, via a mobile device running a mobile device application, via an email, and/or via a text message.

In certain embodiments, the storage of any data indicative of a heightened redemption scrutiny occurs when issuing the ticket voucher at an EGM. In these embodiments, as part of the ticket voucher issuance sequence, the ticket voucher system queries the anti-money laundering system prior to issuing the ticket voucher to inquire if any suspected money laundering activities occurred at that EGM requesting the issuance of a ticket voucher. Such a query includes a request for data associated with one or more of: an EGM identifier, an EGM asset number, an EGM serial number, a cashout amount, a date/time of a cashout event, a player or player tracking card identification (if the identification of the player at the EGM is known). In these embodiments, following the request for data from the anti-money laundering system, the ticket voucher system stores, in association with the issued ticket voucher, any data received from the anti-money laundering system that one or more events occurring at that EGM are indicative of any suspected money laundering activities occurring at that EGM. For example, upon a cashout event at an EGM, prior to issuing a ticket voucher associated with an amount of funds equal to the credit balance of the EGM, the ticket voucher system interfaces with the anti-money laundering system to determine if the activities occurring at that EGM correspond with potentially suspect money laundering behavior. In certain embodiments, the storage of any data indicative of a heightened redemption scrutiny occurs after the issuance of the ticket voucher. In these embodiments, following the receipt of data from the anti-money laundering system that one or more events occurring at an EGM were subsequently determined to be indicative of suspected money laundering activities occurring at that EGM, the ticket voucher system updates one or more databases to store such data in association with the previously issued ticket voucher. As such, the anti-money laundering system is operable to scrutinize activities occurring at an EGM (or other gaming establishment device) before and/or after the issuance of a ticket voucher and alert the ticket voucher system of any suspected activities before and/or after the issuance of a ticket voucher.

In certain embodiments, the system imposes different redemption limits or controls for different users based on whether or not that user is identified by the system. In certain other embodiments, the system imposes different redemption limits or control for different users based on the identity of those users. In certain other embodiments, the system imposes different redemption limits or control for different ticket vouchers based on one or more attributes of the ticket voucher, such as a value of the ticket voucher.

In certain embodiments, in association with a ticket voucher system issuing a ticket voucher and in addition to or alternative from the ticket voucher system interfacing with the anti-money laundering system to inquire if any activities associated with the procurement of the ticket voucher qualify as potentially suspect activities, the anti-money laundering system periodically records session data in a shared cache, such as a Redis cache, that is accessible to other components, such as the ticket voucher system. In these embodiments, the ticket voucher system accesses this shared cache to determine if the requested ticket voucher should be associated with additional scrutiny before the ticket voucher may be redeemed. Following the ticket voucher accessing the shared cache, the ticket voucher system stores a record of the ticket voucher and any indication that one or more activities associated with the procurement of the ticket voucher qualify as potentially suspect activities.

It should be appreciated that while certain embodiments employ a distinct anti-money laundering system that operates with a ticket voucher system to designate zero, one or more ticket vouchers associated with one or more redemption limits or controls, in certain other embodiments, the present disclosure employs one or more ticket voucher systems that operate as an anti-money laundering system as well as issue and/or redeem one or more types of ticket vouchers in association with one or more types of activities. In these embodiments, the ticket voucher system interacts with one or more gaming establishment floor management systems (that track different activities occurring at different gaming establishment devices) to identify and track potential money laundering activities occurring at gaming establishment devices. Such a system associates an additional layer of anti-money laundering security with any ticket vouchers issued in connection with such potential money laundering activities. For example, upon an occurrence of a reporting event occurring at an EGM, at a periodic interval and/or upon a request from the gaming establishment floor management system, the EGM (or a component associated with that EGM, such as a slot machine interface board in communication with a processor of that EGM) communicates data associated with zero, one or more events occurring at that EGM to the gaming establishment floor management system. In this example and in addition to the communication of activity data from the EGMs to the gaming establishment floor management system, upon an occurrence of a reporting event occurring in association with the gaming establishment floor management system, at a periodic interval and/or upon a request from the ticket voucher system, the gaming establishment floor management system communicates part or all of the data associated with one or more events occurring at such EGMs to the ticket voucher system. The ticket voucher system analyzes the data to determine any suspected money laundering activities occurring at that EGM. For instance, the ticket voucher system compares the activities occurring at an EGM to patterns of activities associated with money laundering ventures to determine if the activities occurring at the EGM qualify as potentially suspect activities that warrant certain controls or limitations in the redemption of any ticket vouchers issued in association with such activities at the EGM.

Accordingly, the different embodiments of the system of the present disclosure issue one or more ticket vouchers associated with identifying information that specifies zero, one or more redemption limits or controls on the redemption of that ticket voucher. As such, by modifying certain information associated with one or more ticket vouchers and/or adding certain information in association with one or more ticket vouchers, the system of the present disclosure facilitates the future identification of certain redemption limits or controls applicable for when that ticket voucher is attempted to be redeemed.

In various embodiments, following a user obtaining one or more ticket vouchers that may or may not be associated with one or more redemption limits or controls, such as upon a user of an EGM cashing out a credit balance in exchange for a ticket voucher associated with an amount of funds of the cashed out credit balance, the system enables a user to attempt to redeem such ticket vouchers in exchange for the amount of funds associated with that ticket voucher.

In certain embodiments where the ticket voucher takes the form of a paper ticket voucher and that paper ticket voucher is attempted to be redeemed at a ticket voucher handling device (such as a ticket voucher redemption kiosk or an EGM), responsive to a user inserting a ticket voucher into a slot, such as a bezel, of a bill acceptor of the ticket voucher handling device, the ticket voucher handling device communicates with a ticket voucher system to determine if any redemption limits or controls are associated with the ticket voucher. In certain embodiments where the ticket voucher takes the form of a paper ticket voucher and that paper ticket voucher is attempted to be redeemed for a non-cash form of payment (e.g., a deposit of the amount of funds associated with the ticket voucher into an account associated with the holder of the ticket voucher) using a mobile device application being run on a mobile device, responsive to the mobile device scanning the barcode of the paper ticket voucher (and/or the user of the mobile device utilizing an interface of the mobile device application to input certain identifying information of the paper ticket voucher), the mobile device communicates with a ticket voucher system to determine if any redemption limits or controls are associated with the paper ticket voucher. In certain embodiments where the ticket voucher takes the form of a virtual ticket voucher, following the user selecting, via an interface of the mobile device application, a virtual ticket voucher to redeem, the mobile device application communicates with a ticket voucher system to determine if any redemption limits or controls are associated with the virtual ticket voucher.

In certain embodiments, upon the ticket voucher system identifying the ticket voucher attempted to be redeemed, the ticket voucher system attempts to validate the received ticket voucher. Such an attempted validation of the received ticket voucher includes determining if any redemptions limits or controls are associated with the ticket voucher that prevent the validation of the ticket voucher in association with the requested transaction.

In one embodiment where a redemption control pertains to the type of device that may or may not redeem the ticket voucher, the ticket voucher system determines whether the type of device that the ticket voucher is attempted to be redeemed at qualifies as an eligible or ineligible device to redeem the ticket voucher. If the ticket voucher system determines that the device employed in association with the attempted redemption qualifies as an ineligible device to redeem that particular ticket voucher, the ticket voucher system does not validate the received ticket voucher. For example, if the ticket voucher system determines that a received ticket voucher is associated with a redemption limit that the ticket voucher may not be redeemed at any automated ticket voucher handling device, such as a ticket voucher redemption kiosk or an EGM, and the ticket voucher system further determines that the ticket voucher is attempted to be redeemed at an automated ticket voucher handling device, the ticket voucher system declines the redemption transaction and does not validate the received ticket voucher. On the other hand, if the ticket voucher system determines that the device employed in association with the attempted redemption qualifies as an eligible device to redeem that particular ticket voucher, the ticket voucher system proceeds with the validation the received ticket voucher. For example, if the ticket voucher system determines that a received ticket voucher is associated with a redemption limit that the ticket voucher may not be redeemed at any automated ticket voucher handling device, and the ticket voucher system further determines that the ticket voucher is attempted to be redeemed via a workstation interfacing with gaming establishment personnel, the ticket voucher system proceeds with the redemption transaction and validates, subject to the ticket voucher system determining that the ticket voucher is authentic and has not been previously redeemed and/or voided by the ticket voucher system, the received ticket voucher.

In another embodiment where a redemption control additionally or alternatively pertains to the location where a ticket voucher may or may not be redeemed at, the ticket voucher system additionally or alternatively determines whether the location that the ticket voucher is attempted to be redeemed at qualifies as an eligible or ineligible location to redeem the ticket voucher. If the ticket voucher system determines that the location where the attempted redemption is occurring at qualifies as an ineligible location to redeem that particular ticket voucher, the ticket voucher system does not validate the received ticket voucher. On the other hand, if the ticket voucher system determines that the location where the attempted redemption is occurring at qualifies as an eligible location to redeem that particular ticket voucher, the ticket voucher system proceeds with the redemption transaction and validates, subject to the ticket voucher system determining that the ticket voucher is authentic and has not been previously redeemed and/or voided by the ticket voucher system, the received ticket voucher.

In another embodiment where a redemption control additionally or alternatively pertains to a value of the ticket voucher that may or may not be redeemed using a particular type of device and/or at a particular location, the ticket voucher system additionally or alternatively determines, based on the value of the ticket voucher, the employed device and/or the location of the device, whether the ticket voucher qualifies as eligible or ineligible to be redeemed as part of the requested transaction. If the ticket voucher system determines, based on the value of the ticket voucher, the employed device and/or the location of the device, that the ticket voucher is ineligible to be redeemed as part of the requested transaction, the ticket voucher system does not validate the received ticket voucher. On the other hand, if the ticket voucher system determines, based on the value of the ticket voucher, the employed device and/or the location of the device, that the ticket voucher is eligible to be redeemed as part of the requested transaction, the ticket voucher system proceeds with the redemption transaction and validates, subject to the ticket voucher system determining that the ticket voucher is authentic and has not been previously redeemed and/or voided by the ticket voucher system, the received ticket voucher.

In another embodiment where a redemption control additionally or alternatively pertains to an age of the ticket voucher that may or may not be redeemed using a particular type of device and/or at a particular location, the ticket voucher system additionally or alternatively determines, based on the age of the ticket voucher, the employed device and/or the location of the device, whether the ticket voucher qualifies as eligible or ineligible to be redeemed as part of the requested transaction. If the ticket voucher system determines, based on the age of the ticket voucher, the employed device and/or the location of the device, that the ticket voucher is ineligible to be redeemed as part of the requested transaction, the ticket voucher system does not validate the received ticket voucher. On the other hand, if the ticket voucher system determines, based on the age of the ticket voucher, the employed device and/or the location of the device, that the ticket voucher is eligible to be redeemed as part of the requested transaction, the ticket voucher system proceeds with the redemption transaction and validates, subject to the ticket voucher system determining that the ticket voucher is authentic and has not been previously redeemed and/or voided by the ticket voucher system, the received ticket voucher.

In another embodiment where a redemption control additionally or alternatively pertains to an identity of a holder of the ticket voucher (if known) that may or may not be redeemed using a particular type of device and/or at a particular location, the ticket voucher system additionally or alternatively determines, based on the identity of the holder of the ticket voucher, the employed device and/or the location of the device, whether the ticket voucher qualifies as eligible or ineligible to be redeemed as part of the requested transaction. If the ticket voucher system determines, based on the identity of the holder of the ticket voucher, the employed device and/or the location of the device, that the ticket voucher is ineligible to be redeemed as part of the requested transaction, the ticket voucher system does not validate the received ticket voucher. On the other hand, if the ticket voucher system determines, based on the identity of the holder of the ticket voucher, the employed device and/or the location of the device, that the ticket voucher is eligible to be redeemed as part of the requested transaction, the ticket voucher system proceeds with the redemption transaction and validates, subject to the ticket voucher system determining that the ticket voucher is authentic and has not been previously redeemed and/or voided by the ticket voucher system, the received ticket voucher.

Figure 3:
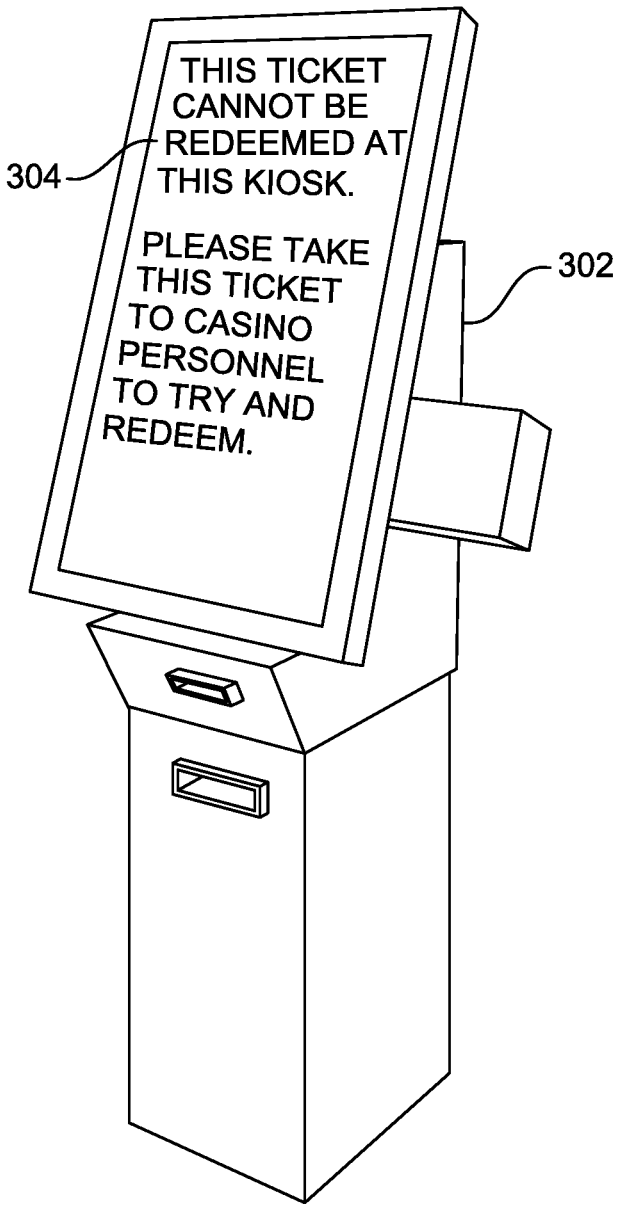
FIG. 3 is an example graphical user interface of one embodiment of the present disclosure displayed by a gaming establishment device in association with a denied redemption of a ticket voucher associated with a restricted redemption attribute.

If the ticket voucher system determines, at least partially based on any applicable redemption controls, not to validate the received ticket voucher, the ticket voucher system communicates, to the ticket voucher handling device, data associated with the rejected redemption of the ticket voucher. That is, if the ticket voucher system determines that any aspect of the attempted ticket voucher redemption transaction violates any redemption limits or controls associated with the ticket voucher, the ticket voucher system rejects the attempted redemption of a ticket voucher and ceases the attempted ticket voucher redemption. In these embodiments, the ticket voucher handing device returns, if applicable, the ticket voucher to the user of the ticket voucher handing device and displays zero, one or more messages regarding the rejection of the received ticket voucher. In certain embodiments, one or more messages regarding the rejection of the received ticket voucher includes a notification indicating the redemption controls associated with the ticket voucher that caused the rejection of the ticket voucher. For example, as seen in FIG. 3, upon a kiosk 302 receiving, from a server of a ticket voucher system, data associated with a rejection of an attempted ticket voucher redemption at least partially based on the kiosk being an ineligible type of device at which that particular ticket voucher may be redeemed at, the kiosk causes a notification 304 to be displayed that informs the holder of the ticket voucher that the ticket voucher may not be redeemed at any kiosk but rather may be potentially redeemed by casino personnel. In certain embodiments, such messages regarding the rejection of the received ticket voucher are provided to the holder of the ticket voucher via any suitable notification mechanism including, but not limited to, the ticket voucher handling device, a remote host controlled service window displayed by the ticket voucher handling device, a mobile device running a mobile device application, via an email, and/or via a text message.

On the other hand, if the ticket voucher system determines, at least partially based on any applicable redemption controls, to validate the received ticket voucher, the ticket voucher system updates one or more ticket voucher databases to reflect the redemption of the received ticket voucher. Such a ticket voucher database stores various fields of data utilized by the ticket voucher system to track issued ticket vouchers. In different embodiments, the database fields of the ticket voucher database which the ticket voucher system may update and/or utilize to approve a redemption of a ticket voucher include, but are not limited to: (i) a primary key (i.e., an index for the record in the table); (ii) a ticket voucher validation number (i.e., the validation number associated with the issued ticket); (iii) a ticket state (e.g., a state of a ticket as being in a paid state, an unpaid state or a suspect state); (iv) an issuance date (i.e., the date when the ticket voucher was issued); (v) a property address associated with the ticket voucher issuance; (vi) an amount of funds associated with the ticket voucher; (vii) any expiration date associated with the ticket voucher; (viii) a device identification associated with the issuance of the ticket voucher; (ix) an image of the ticket voucher (e.g., an image of a front of the ticket voucher and/or an image of a back of the ticket voucher); (x) a redemption date (i.e., the date the ticket voucher was redeemed at (if the ticket voucher is in the redeemed state; (xi) redeemed at (i.e., the device where the ticket voucher was redeemed (if the ticket voucher is in the redeemed state)); (xii) a data signature (i.e., a signature of the data associated with the ticket voucher to prevent tampering by casino employees); and/or (xiii) compliance with any associated redemption limits or controls.

In addition to updating any database to reflect the redemption of the ticket voucher, the ticket voucher system notifies the ticket voucher handling device of the amount associated with the received ticket voucher, dispenses an amount of cash equal to the amount of the received ticket voucher (if the ticket voucher is being redeemed for cash) and the ticket voucher handling device updates one or more balances to reflect the amount associated with the received ticket voucher.

It should be appreciated that the issuance of one or more ticket vouchers (that may or may not be associated with a restricted redemption attribute) utilizes one or more components of a ticket voucher system and/or one or more components of an anti-money laundering system. Such components of the ticket voucher system and/or such components of the anti-money laundering system include a controller including at least one processor. The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the ticket voucher system and/or the component of the anti-money laundering system; (3) accessing memory to configure or reconfigure parameters in the memory according to indicia read from the component of the ticket voucher system and/or the component of the anti-money laundering system; (4) communicating with interfaces and the peripheral devices (such as input/output devices); and/or (5) controlling the peripheral devices. In certain embodiments, one or more components of the controller (such as the at least one processor) reside within a housing of the component of the ticket voucher system and/or the component of the anti-money laundering system, while in other embodiments, at least one component of the controller resides outside of the housing of the component of the ticket voucher system and/or the component of the anti-money laundering system.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the ticket voucher system and/or the component of the anti-money laundering system disclosed herein. In certain embodiments, the at least one memory device resides within the housing of the component of the ticket voucher system and/or the component of the anti-money laundering system, while in other embodiments at least one component of the at least one memory device resides outside of the housing of the component of the ticket voucher system and/or the component of the anti-money laundering system. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the ticket voucher system and/or the component of the anti-money laundering system; (2) associations between configuration indicia read from a component of the ticket voucher system and/or the component of the anti-money laundering system with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the ticket voucher system and/or the component of the anti-money laundering system to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and disclosed in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are disclosed with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the ticket voucher system and/or the component of the anti-money laundering system to control the component of the ticket voucher system and/or the component of the anti-money laundering system. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a component of the ticket voucher system and/or the component of the anti-money laundering system to implement at least part of the present disclosure. In other embodiments, part or all of the program code and/or operating data is downloaded to the at least one memory device of the component of the ticket voucher system and/or the component of the anti-money laundering system through any suitable data network described above (such as an Internet or intranet).

The at least one memory device also stores a plurality of device drivers. Examples of different types of device drivers include device drivers for the component of the ticket voucher system and/or the component of the anti-money laundering system and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the ticket voucher system and/or the component of the anti-money laundering system. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the ticket voucher system and/or the component of the anti-money laundering system loads the new device driver from the at least one memory device to enable communication with the new device. For instance, one type of card reader in the component of the ticket voucher system and/or the component of the anti-money laundering system can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate the specified component of the ticket voucher system and/or the specified component of the anti-money laundering system components and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device and at least one pre-paid debit card dispenser; (2) at least one input device (which may include contact and/or non-contact interfaces) including at least one debit card/credit card reader; (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

As indicated above, in various embodiments, one or more actions occur between a mobile device and one or more components of the ticket voucher system and/or one or more components of the anti-money laundering system, via one or more wireless communication protocols between the mobile device and the component of the ticket voucher system and/or the component of the anti-money laundering system. In these embodiments, the mobile device application of the mobile device communicates ticket voucher identifying information to one or more components of the anti-money laundering system and/or one or more components of the ticket voucher system over one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and/or one or more short range communication protocols (e.g., a near field communication ("NFC") protocol).

In certain embodiments, the communication with the mobile device can occur through one or more wireless interfaces of the component of the ticket voucher system and/or the component of the anti-money laundering system. In one embodiment, the wireless interface is integrated into the cabinet of the component of the ticket voucher system and/or the component of the anti-money laundering system and the processor of the component of the ticket voucher system and/or the component of the anti-money laundering system is configured to communicate directly with and send control commands to the wireless interface. In another embodiment, the wireless interface is integrated into a device mounted to and/or within the cabinet of the component of the ticket voucher system and/or the component of the anti-money laundering system. In certain embodiments where the wireless interface is embedded in a secondary device, the processor of the component of the ticket voucher system and/or the component of the anti-money laundering system sends control commands to control the wireless interface via a secondary controller.

It should be appreciated that while certain data or information pertaining to one or more of the requested actions are communicated between a component of the ticket voucher system and/or the component of the anti-money laundering system and a mobile device, such data or information may additionally or alternatively be communicated: (i) between one or more servers and a mobile device via one or more wireless communication protocols, or (ii) between a component of the ticket voucher system and/or the component of the anti-money laundering system and one or more servers via one or more wireless communication protocols and then from one or more servers to a mobile device via one or more wireless communication protocols.

It should additionally be appreciated that any functionality or process disclosed may be implemented via one or more servers, a component of the anti-money laundering system, a component of the ticket voucher system, or a mobile device application. For example, while certain data or information disclosed is explained as being communicated from a component of the ticket voucher system and/or a component of the anti-money laundering system to a mobile device via one or more wireless communication protocols, such data or information may additionally or alternatively be communicated from one or more servers to a mobile device via one or more wireless communication protocols. Accordingly: (i) while certain functions, features or processes are disclosed as being performed by a component of the ticket voucher system and/or a component of the anti-money laundering system, such functions, features or processes may alternatively be performed by one or more servers, or one or more mobile device applications, (ii) while certain functions, features or processes are disclosed as being performed by one or more mobile device applications, such functions, features or processes may alternatively be performed by one or more servers, one or more components of the anti-money laundering system or one or more components of the ticket voucher system, (iii) while certain functions, features or processes are disclosed as being performed by one or more servers, such functions, features or processes may alternatively be performed by one or more components of the ticket voucher system, one or more components of the anti-money laundering system or one or more mobile device applications, (iv) while certain functions, features or processes are disclosed as being performed by one or more components of the ticket voucher system, such functions, features or processes may alternatively be performed by one or more components of the anti-money laundering system, one or more mobile device applications, or one or more servers, and (v) while certain functions, features or processes are disclosed as being performed by one or more components of the anti-money laundering system, such functions, features or processes may alternatively be performed by one or more components of the ticket voucher system, one or more mobile device applications, or one or more servers.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments disclosed will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:

a processor; and a memory device that stores a plurality of instructions that, when executed by the processor responsive to an occurrence of a gaming establishment cashless ticket voucher request, cause the processor to:

determine, based on an analysis of monitored activity data received, via a network interface, from a device operating independent of the processor, if any monitored activity associated with the gaming establishment cashless ticket voucher request qualifies as potential suspicious activity, wherein activity data is monitored in association with a plurality of electronic gaming machines and comprises at least one of: an identified occurrence of an amount of currency received to modify a credit meter followed by a cashout event without at least a threshold amount of wagers placed, and an identified occurrence of at least a threshold quantity of credit meter movements from a beginning of a session to an ending of the session caused by the cashout event, responsive to the determination being that a monitored activity associated with the gaming establishment cashless ticket voucher request qualifies as the potential suspicious activity and responsive to a separate determination to approve the gaming establishment cashless ticket voucher request, cause a gaming establishment cashless ticket voucher associated with an amount of funds to be issued, wherein the issued gaming establishment cashless ticket voucher comprises a displayed redemption limitation notification pertaining to a restricted redemption of the gaming establishment cashless ticket voucher to access the amount of funds and an electronic record of the issued gaming establishment ticket voucher is associated, in a gaming establishment cashless ticket voucher database, with a restricted redemption attribute, and responsive to the determination being that the monitored activity associated with the gaming establishment cashless ticket voucher request does not qualify as the potential suspicious activity and responsive to the separate determination to approve the gaming establishment cashless ticket voucher request, cause the gaming establishment cashless ticket voucher associated with the amount of funds to be issued, wherein the issued gaming establishment cashless ticket voucher comprises no displayed redemption limitation notification and the electronic record of the issued gaming establishment ticket voucher is not associated, in the gaming establishment cashless ticket voucher database, with any restricted redemption attribute.

2. The system of claim 1, wherein the memory device stores a plurality of further instructions that when executed by the processor, cause the processor to cause data associated with at least one of the restricted redemption attribute and the potential suspicious activity to be communicated to a server of a gaming establishment cashless ticket voucher system that determines whether to approve the gaming establishment cashless ticket voucher request.

3. The system of claim 1, wherein the memory device stores a plurality of further instructions that when executed by the processor, cause the processor to cause data associated with at least one of the restricted redemption attribute and the potential suspicious activity to be communicated to a shared cache accessible by a server of a gaming establishment cashless ticket voucher system that determines whether to approve the gaming establishment cashless ticket voucher request.

4. The system of claim 1, wherein the memory device stores a plurality of further instructions that when executed by the processor, cause the processor to determine whether to approve the gaming establishment cashless ticket voucher request.

5. The system of claim 1, wherein the device comprises one of an electronic gaming machine of the plurality of electronic gaming machines and a kiosk associated with a gaming establishment cashless ticket voucher system.

6. The system of claim 1, wherein the restricted redemption attribute comprises a designated gaming establishment cashless ticket voucher state that is different from a paid gaming establishment cashless ticket voucher state and a non-designated unpaid gaming establishment cashless ticket voucher state.

7. The system of claim 1, wherein the restricted redemption attribute is associated with an eligible redemption via a first gaming establishment cashless ticket voucher redemption device and an ineligible redemption via a second, different gaming establishment cashless ticket voucher redemption device.

8. The system of claim 1, wherein causing the electronic record of the issued gaming establishment cashless ticket voucher to be associated, in the gaming establishment cashless ticket voucher database, with the restricted redemption attribute occurs after the issuance of the gaming establishment cashless ticket voucher associated with the amount of funds.

9. A system comprising:
a processor; and
a memory device that stores a plurality of instructions that, when executed by the processor responsive to an occurrence of a gaming establishment cashless ticket voucher request, cause the processor to:
determine, based on an analysis of monitored activity data received, via a network interface, from a device operating independent of the processor, if any monitored activity associated with the gaming establishment cashless ticket voucher request qualifies as a potential suspicious activity, wherein activity data is monitored in association with a plurality of electronic gaming machines and comprises at least one of: an identified occurrence of an amount of currency received to modify a credit meter followed by a cashout event without at least a threshold amount of wagers placed, and an identified occurrence of at least a threshold quantity of credit meter movements from a beginning of a session to an ending of the session caused by the cashout event, and
responsive to the determination being that a monitored activity associated with the gaming establishment cashless ticket voucher request qualifies as the potential suspicious activity and responsive to a separate determination not to approve the gaming establishment cashless ticket voucher request, cause a display, by a display device, of a denial of the gaming establishment cashless ticket voucher request and forgo causing any gaming establishment cashless ticket vouchers associated with any amount of funds to be issued in association with the occurrence of the gaming establishment cashless ticket voucher request.

10. The system of claim 9, wherein the memory device stores a plurality of further instructions that when executed by the processor, cause the processor to cause data associated with the potential suspicious activity to be communicated to a server of a gaming establishment cashless ticket voucher system that determines whether to approve the gaming establishment cashless ticket voucher request.

11. The system of claim 9, wherein the memory device stores a plurality of further instructions that when executed by the processor, cause the processor to cause data associated with the potential suspicious activity to be communicated to a shared cache accessible by a server of a gaming establishment cashless ticket voucher system that determines whether to approve the gaming establishment cashless ticket voucher request.

12. The system of claim 9, wherein the memory device stores a plurality of further instructions that when executed by the processor, cause the processor to determine to approve the gaming establishment cashless ticket voucher request.

13. A method of operating a system, the method comprising:
responsive to an occurrence of a gaming establishment cashless ticket voucher request:
determining, by a processor and based on an analysis of monitored activity data received, via a network interface, from a device operating independent of the processor, if any monitored activity associated with the gaming establishment cashless ticket voucher request qualifies as potential suspicious activity, wherein activity data is monitored in association with a plurality of electronic gaming machines and comprises at least one of: an identified occurrence of an amount of currency received to modify a credit meter followed by a cashout event without at least a threshold amount of wagers placed, and an identified occurrence of at least a threshold quantity of credit meter movements from a beginning of a session to an ending of the session caused by the cashout event, responsive to the determination being that a monitored activity associated with the gaming establishment cashless ticket voucher request qualifies as the potential suspicious activity and responsive to a separate determination to approve the gaming establishment cashless ticket voucher request, causing a gaming establishment cashless ticket voucher associated with an amount of funds to be issued, wherein the issued gaming establishment cashless ticket voucher is caused to include a displayed redemption limitation notification pertaining to a restricted redemption of the gaming establishment cashless ticket voucher to access the amount of funds, and an electronic record of the issued gaming establishment cashless ticket voucher is caused to be associated, in a gaming establishment cashless ticket voucher database, with a restricted redemption attribute, and responsive to the determination being that the monitored activity associated with the gaming establishment cashless ticket voucher request does not qualify as the potential suspicious activity and responsive to the separate determination to approve the gaming establishment cashless ticket voucher request, causing the gaming establishment cashless ticket voucher associated with the amount of funds to be issued, wherein the issued gaming establishment cashless ticket voucher comprises no displayed redemption limitation notification and the electronic record of the issued gaming establishment ticket voucher is not associated, in the gaming establishment cashless ticket voucher database, with any restricted redemption attribute.

14. The method of claim 13, further comprising causing data associated with at least one of the restricted redemption attribute and the potential suspicious activity to be communicated to a server of a gaming establishment cashless ticket voucher system that determines whether to approve the gaming establishment cashless ticket voucher request.

15. The method of claim 13, further comprising causing data associated with at least one of the restricted redemption attribute and the potential suspicious activity to be communicated to a shared cache accessible by a server of a gaming establishment cashless ticket voucher system that determines whether to approve the gaming establishment cashless ticket voucher request.

16. The method of claim 13, further comprising determining, by the processor, whether to approve the gaming establishment cashless ticket voucher request.

17. The method of claim 13, wherein the device comprises one of an electronic gaming machine of the plurality of electronic gaming machines and a kiosk associated with a gaming establishment cashless ticket voucher system.

18. The method of claim 13, wherein the restricted redemption attribute comprises a designated gaming establishment cashless ticket voucher state that is different from a paid gaming establishment cashless ticket voucher state and a non-designated unpaid gaming establishment cashless ticket voucher state.

19. The method of claim 13, wherein the restricted redemption attribute is associated with an eligible redemption via a first gaming establishment cashless ticket voucher redemption device and an ineligible redemption via a second, different gaming establishment cashless ticket voucher redemption device.

20. The method of claim 13, wherein causing the electronic record of the issued gaming establishment cashless ticket voucher to be associated, in the gaming establishment cashless ticket voucher database, with the restricted redemption attribute occurs after the issuance of the gaming establishment cashless ticket voucher associated with the amount of funds.

* * * * *